United States Patent [19]

Journee

[11] 4,083,642
[45] Apr. 11, 1978

[54] DEVICE FOR SECURING A WIPER BLADE TO AN ARM

[75] Inventor: Maurice Andre Journee, Reilly, France

[73] Assignee: Paul Journee S.A., Reilly, France

[21] Appl. No.: 711,917

[22] Filed: Aug. 5, 1976

[30] Foreign Application Priority Data

Sep. 16, 1975   France .............................. 75 28302

[51] Int. Cl.² .............................................. B25G 3/00
[52] U.S. Cl. ................................. 403/316; 15/250.32
[58] Field of Search .............. 403/315, 316, 317, 327, 403/161, 18, 20, 49; 15/250.32, 250.35

[56] References Cited

U.S. PATENT DOCUMENTS

| 169,582 | 11/1875 | Quick | 403/161 X |
|---|---|---|---|
| 213,226 | 3/1879 | McDermott | 403/327 X |
| 1,321,113 | 11/1919 | Longren | 403/46 |
| 2,587,058 | 2/1952 | Melrose | 403/161 X |
| 3,163,877 | 1/1965 | Wubbe | 15/250.32 |
| 3,175,453 | 3/1965 | Williams | 403/316 X |
| 3,806,265 | 4/1974 | Hattan | 403/46 |
| 3,883,919 | 5/1975 | Harbison et al. | 15/250.32 |
| 3,922,749 | 12/1975 | Castleman et al. | 15/250.32 |

FOREIGN PATENT DOCUMENTS

| 1,300,765 | 7/1962 | France | 403/163 |
|---|---|---|---|
| 2,310,374 | 9/1974 | Germany | 15/250.32 |

*Primary Examiner*—Wayne L. Shedd
*Attorney, Agent, or Firm*—Nolte and Nolte

[57] ABSTRACT

A device for mounting a windscreen wiper blade on a pivotal arm, of the type in which one of the two parts comprises a projecting pin adapted to cooperate with a bore of the other part. Said pin is provided with locking means adapted to cooperate with the end of said bore opposed to the end through which said pin is introduced.

1 Claim, 12 Drawing Figures

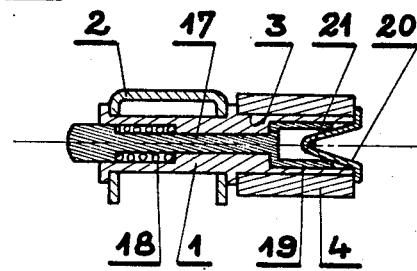
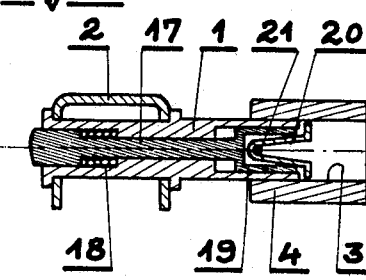
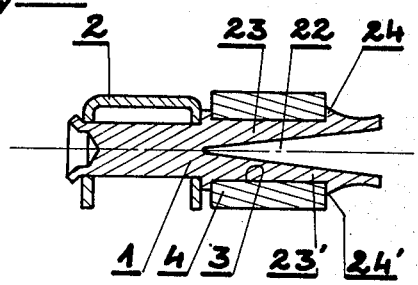
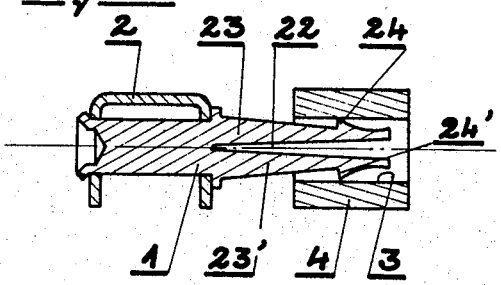
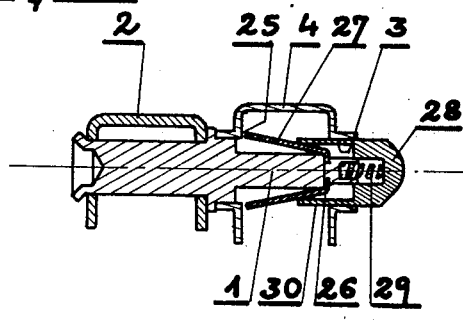
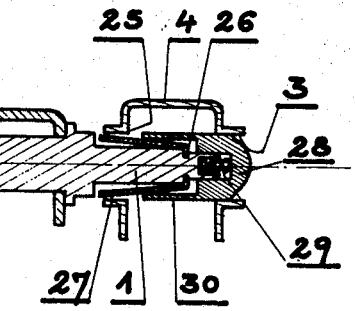

DEVICE FOR SECURING A WIPER BLADE TO AN ARM

The present invention relates to windscreen wipers for automobile vehicles and more particularly to a mounting of a detachable wiper blade on an arm.

It is known, in order to achieve such a mounting, to provide the blade or the arm with a projecting pin adapted to cooperate with a bore provided in the other part and provided with locking means which allow a relative rotation between the blade and the arm about the pivot constituted by said pin.

This type of mounting permits a rapid exchange of the blade, which is the part which undergoes the greatest wear and must be replaced rather frequently. However, mounting systems of this type only allow the adoption of a blade which has been specially designed for this purpose, that is to say, a blade having a bore receiving a pin with means for locking this pin or a blade itself provided with a pin. They do not allow the mounting of blades of another type, such as blades secured by bayonet or hook means. Moreover, the known systems require, the case of a pin integral with the arm, the exchange of a blade provided with locking means, which increases the price of the exchanged part constituted by said blade.

An object of the invention is to avoid these drawbacks of the known devices.

According to the present invention, there is provided a device for securing a windscreen wiper blade on a pivotal arm of the type in which one of the two parts has a projecting pin adapted to cooperate with a bore in the other part, wherein said pin is provided with locking means adapted to cooperate with the end of said bore opposed to the end thereof through which said pin is introduced.

The use of locking means combined with the pin enables the part that does not have the pin to be simplified which is very advantageous if this part is the blade. Moreover, these locking means can cooperate with an intermediate mounting part provided with a bore and adapted to be fixed by a different fixing device, for example having bayonet or hook means.

An understanding of the present invention will be had from the ensuing description with reference to the accompanying drawings in which.

Figure 1:
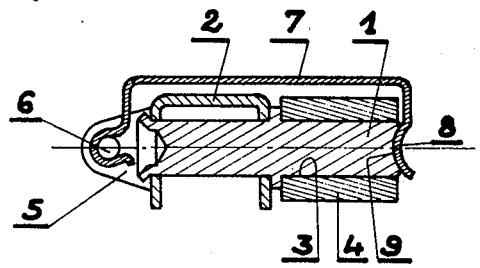
FIG. 1 is an axial sectional view of a mounting pin according to one embodiment of the invention, after assembly with an intermediate element.
Figure 2:
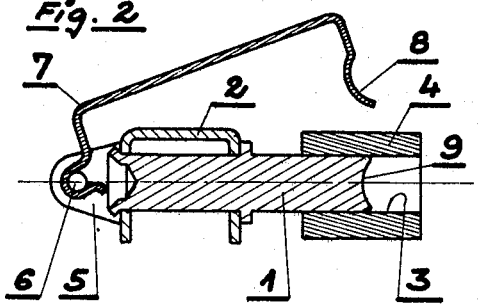
FIG. 2 is similar to FIG. 1, the component parts being in the course of disassembly.

FIGS. 3, 5, 7, 9 and 11 are similar to FIG. 1 and concern various modifications of the invention, and FIGS. 4, 6, 8, 10 and 12 are similar to FIG. 2 and concern the modifications shown in FIGS. 3, 5, 7, 9 and 11 respectively.

In the illustrated embodiments, the mounting pin 1 is integral with a windscreen wiper blade 2 and cooperates with a bore 3 of an intermediate element 4. The element 4 is adapted to cooperate with an arm (not shown) which is provided with mounting means having, forexample, a bayonet. hook, etc. By eliminating the intermediate element 4, the pin 1 can be mounted directly in a bore extending through a windscreen wiper arm. As mentioned hereinbefore, inversely, the pin 1 may be integral with the arm.

In the embodiment shown in FIGS. 1 and 2, the blade 2 carries a bracket 5 provided with a stud 6 on which there is pivotally mounted a lock member 7 constituted by a spring strip folded into the shape of a U, the end thereof opposed to the stud 6 having a boss 8 which cooperates with a recess 9 in the free end of the pin 1.

Figure 3:
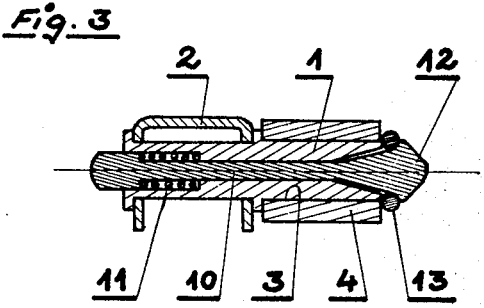
Figure 4:
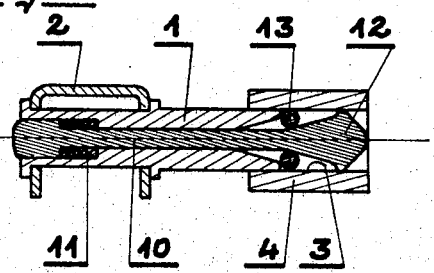

In the modification shown in FIGS. 3 and 4, the pin is provided with an axial throughway bore containing a push-rod 10 which is slidable in the bore in opposition to the action of a spring 11. The push-rod 10 terminates in a conical head 12 which, upon extension of the spring 11, elastically and radially expands a split locking ring 13. When the spring 11 is compressed, the ring 13 contracts and assumes a diameter which is less than that of the bore 3.

Figure 5:
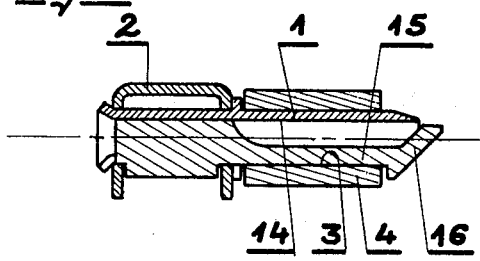
Figure 6:
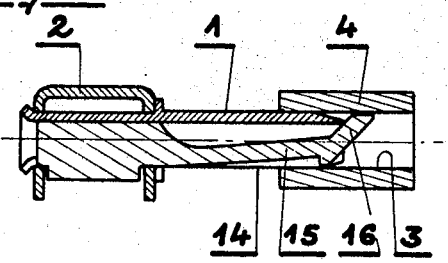

In the embodiment shown in FIGS. 5 and 6, the pin 1 is constituted by a tube 14 in which there is mounted a locking member of an elastic material forming a deformable elongated finger member 15 which terminates in a hook 16 adapted to project out of the intermediate element 4 in the mounted position (FIG. 5). Disassembly is achieved by elastically deforming the finger member 15 so as to withdraw the hook 16. The locking member can be slidable in a longitudinal bore in the pin.

In the embodiment shown in FIGS. 7 and 8, the pin 1 has an axial bore in which there is slidable a push-rod 17 which is biased by a spring 18. The push-rod 17 terminates in a fork 19 which cooperates with a locking member constituted by a spring strip 20 folded into the shape of a V and retained by a pin 21 integral with the pin 1.

In the embodiment shown in FIGS. 9 and 10, the pin 1 is of an elastic material and has an axial slit 22 defining two arms 23 and 23' provided respectively with hooks 24 and 24' which project out of the element 4 in the mounted position (FIG. 9). To disassemble, it is sufficient to move the two arms 23 and 23' towards each other to withdraw the hooks 24 and 24'.

In the embodiment shown in FIGS. 11 and 12, the intermediate element 4 has an inner shoulder 25 and the pin 1 carries a locking member 26 having elastic arms 27 which cooperate with the shoulder 25 in the mounted position. The free end of the pin 1 carries a push-member 28 biased by a spring 29 and having a cylindrical skirt portion 30 which cooperates with the arms 27 so as to withdraw them when the push-member 29 is depressed and compresses the spring 29.

What is claimed is:

1. A device for mounting a windshield wiper blade on a pivotal arm comprises a pin fixably secured to and projecting from one of said blade and arm, a pin receiving passage in the other of said blade and arm, clip means pivoted to said one of said blade and arm adjacent to said pin and movable to be engaged and disengaged with that end of the pin receiving passage opposite to an end through which the pin is inserted into that passage, said clip means constituting means securing said blade and arm together when engaged with said opposite end of said passage.

* * * * *